United States Patent Office 3,733,257
Patented May 15, 1973

3,733,257
RADIATION INITIATED PROCESS FOR THE GRAFT COPOLYMERIZATION OF BINARY MONOMER MIXTURES AND CELLULOSE
Jett C. Arthur, Jr., Metairie, and James A. Harris, Pearl River, La., assignors to the United States of America as represented by the Secretary of Agriculture
No Drawing. Filed Nov. 19, 1971, Ser. No. 200,618
Int. Cl. B01j 1/10, 1/12; C08d 9/06
U.S. Cl. 204—159.12                     9 Claims

ABSTRACT OF THE DISCLOSURE

Industrial textiles and rigid construction cellulose-copolymer products are produced by processes of this disclosure. The fibrous cellulosic material is dried in the absence of oxygen to a moisture content of about 2%, irradiated with a radioactive source, then reacted with one of several binary monomer mixtures which are in certain preferred solvent mixtures and washed.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a multi-step process for the preparation of cellulose-copolymer products for use in durable press textile products, improved cellulosic wood block flooring, heat moldable cellulose-copolymer industrial construction products, and the like, wherein (1) the macromolecular properties of cellulose and the morphological structures of cellulose are selectively and permanently changed by a free radical initiated graft copolymerization process, (2) mixtures of vinyl monomers are used in which the low molecular reactivity of some vinyl monomers for cellulosic free radicals is overcome by using selected vinyl monomers with high molecular reactivity for cellulosic radicals which form growing graft copolymer side chains with terminal free radicals for which other selected vinyl monomers (with low molecular reactivity for cellulosic radicals) in the mixture have high molecular reactivity for the graft copolymer radicals, and thereby (3) modified cellulose-copolymers with grafted block polymer side chains with desired composition and durable-press textile, abrasion, and heat moldable properties are formed.

Cellulose, the world's most important and widely used polymer, has many desirable natural properties and has been used in past years with little or no changes in these properties. However, increasing competition from man-made polymers, and macromolecular, morphological, and chemical modifications of cellulose have been usual. For example, cotton has been modified to improve its durable press and soil release properties; wood block flooring has been modified to improve its abrasion resistance and water repellant properties; cellulosic construction materials have been modified to improve their weather, rot, and flame resistance. Developments in using free radical initiators for copolymerizing vinyl monomers with cellulose have offered the possibility of modifying the macromolecular, morphological, and chemical properties of cellulose with minimum changes in the desirable natural properties of cellulose. For example, industrial processes for modifying the properties of wood block flooring, by first impregnating them with vinyl monomers and then exposing the mixture to high energy ionizing radiation to initiate free radical copolymerization reactions of the vinyl monomers with the cellulosic free radicals formed, have been reported and are in commercial use. Also, free radical reactions of vinyl groups with cellulosic radicals formed in textiles on exposure to high energy radiation to give products with durable press and soil release properties are reportedly in commercial use. One of the limitations for the commercial applications of these processes has been that different vinyl monomers, particularly in different solvents, show varying degrees of molecular reactivity and rate and extent of copolymerization reaction with the cellulosic radicals. In many cases, it would be desirable to graft copolymerize selected vinyl monomers, with low molecular reactivity with cellulosic radicals, to impart a new and desired property to the cellulosic copolymer product. However, in the usual process this would not be economically or technologically feasible due to the low rate and extent of copolymerization of some vinyl monomers with cellulosic radicals.

The instant invention defines a distinct improvement in selectively effecting the rate and extent of copolymerization of vinyl monomers, that is, molecular reactivity of vinyl monomers, with cellulosic radicals, and in selectively effecting the composition of the block copolymer grafted to cellulose. For example, after using high energy ionizing radiation to produce long-lived free radicals on the cellulose molecule (a convenient way to produce these radicals), selected mixtures of vinyl monomers in selected solvents were contacted with the fibrous cellulose containing long-lived radicals. The effects of solvent were twofold. (1) the swelling of the macrostructure of the fibrous cellulose by the solvent to allow penetration of the solution of monomers into the macrostructure, thereby increasing the accessibility of the cellulosic radicals to initiate copolymerization reactions; and (2) the accelerative effects of selected solvents on the rate and extent of copolymerization of selected vinyl monomers. For example, the addition of water to the solvents generally increased the extent of copolymerization since water is a poor solvent for most polymers and therefore exerts an accelerative effect on most copolymerization reactions.

When fibrous cellulose, containing free radicals, are immersed in solvents containing binary monomer mixtures, the following types of chain copolymerization reactions can be initiated:

 (1)
 (2)
 (3)
 (4)
 (5)
 (6)

where cell· is the cellulosic radical; A is one type of vinyl monomer; B is another type of vinyl monomer. The relative molecular reactivities of monomer A or monomer B for the cellulosic radical and for the growing polymer chain radical determnie the rate and extent of copolymerization and composition of the grafted polymer or grafted block polymer. For example, addition of styrene, 1,3-butylene dimethacrylate, or vinyl pyrrolidone to acrylonitrile in the solvent increased the extent of graft copolymerization initiated by the cellulosic radical to a maximum value; addition of vinylidene chloride or allyl methacrylate to acrylonitrile did not greatly effect the extent of graft copolymerization; addition of methyl or glycidyl methacrylate to acrylonitrile increased the extent of graft copolymerization without passing through a maximum value. In the case of the styrene-acrylonitrile block copolymer, the concentration of acrylonitrile in the grafted copolymer was decreased, as compared with the concentration of acrylonitrile in the monomer solution. In the case of the vinylidene acrylonitrile copolymer, the concentration of acrylonitrile in the copolymer was increased, as compared with the concentration of acrylonitrile in the monomer solution. The concentration of acrylonitrile in the methyl methacrylate-acrylonitrile copolymer was decreased, as compared with that of acrylonitrile in the monomer solution. The molecular relationships between the grafted block copolymer formed from the vinyl monomers with fibrous cellulose determine the properties of the cellulose-copolymer products and their useful industrial appliations, as discussed earlier.

The following examples are presented to illustrate preferred embodiments of the invention in more detail, and should not be construed as limiting the invention in any manner whatever.

EXAMPLE 1

Cotton fibers were dried to less than 2 percent moisture in a vacuum oven at 50° C., sealed in a nitrogen atmosphere in a thin-walled glass container and then irradiated to a dosage of 1 megarad by cobalt-60 gamma-radiation. About 24 hours later the radiation-activated cotton fibers (1.5 parts) were impregnated in solutions (50 parts) containing binary mixtures of acrylonitrile (AN) and methyl methacrylate (MMA) (total of 15 parts of vinyl monomer) at 25° C. in the absence of oxygen for the 30 minutes. Then the cotton cellulose-coplymer was washed several times with the solvent used to remove unreacted monomer. The cellulose-copolymer was finally washed with water and dried 16 hours in vacuum at 50° C. The extent of copolymer formation was determined as the increase in weight of the cotton fiber-copolymer over that of cotton fiber similarly treated except for the omission of the vinyl monomers. The initial composition of the monomer solution and the composition of the grafted block coplymer were determined. The range of selected variations in composition and extent of copolymerization of acrylonitrile-methyl methacrylate copolymer with radiation activated cotton is summarized as follows:

| AN/MMA in solvent, mole/mole | Solvent | Reaction time, min. | Copolymer add-on, percent | Poly(AN)/poly(MMA) in copllymer, mole/mole |
|---|---|---|---|---|
| 23 | 43% H₂O/57% McOH | 30 | 14 | 12 |
| 8.0 | Same as above | 20 | 14 | 4.0 |
| 1.6 | do | 30 | 16 | 0.85 |
| 0.80 | do | 30 | 25 | 0.45 |
| 0.32 | do | 30 | 47 | 0.21 |
| 0.11 | do | 30 | 82 | 0.076 |

EXAMPLE 2

The method of Example 1 was employed except that the monomer mixture was acrylonitrile-butyl methacrylate (BMA). The range of selected variations in composition and extent of copolymerization of acrylonitrile-butyl methacrylate with radiation activated cotton is summarized, as follows:

| AN/MMA in solvent, mole/mole | Solvent | Reaction time, min. | Copolymer add-on, percent | Poly(AN)/poly(MMA) in copllymer, mole/mole |
|---|---|---|---|---|
| 34 | 23% H₂O/77% McOH | 30 | 11 | 13 |
| 12 | Same as above | 30 | 11 | 7.7 |
| 2.4 | do | 30 | 10 | 1.7 |
| 1.2 | do | 30 | 12 | 0.84 |
| 0.49 | do | 30 | 16 | 0.43 |

EXAMPLE 3

The method of Example 1 was employed except that the monomer mixture was acrylonitrile-lauryl methacrylate (LMA). The range of selected variations in composition and extent of copolymeriztion of acrylonitrile-lauryl methacrylate with radiation activated cotton is summarized, as follows:

| AN/LMA in solvent, mole/mole | Solvent | Reaction time, min. | Copolymer add-on, percent | Poly(AN)/poly(MMA) in copllymer, mole/mole |
|---|---|---|---|---|
| 9.2 | 32% MeEtketone/68% DMSO | 240 | 21 | 57 |
| 4.6 | Same as above | 240 | 17 | 16 |
| 2.3 | do | 240 | 16 | 4.1 |
| 2.3 | od | 180 | 17 | 5.4 |
| 2.3 | do | 1,140 | 35 | 1.7 |

EXAMPLE 4

The method of Example 1 was employed except that the monomer mixture wos acrylonitrile-glycidyl methacrylate (GMA). The range of selected variations in composition and extent of copolymerization of acrylonitrile-glycidyl methacrylate with radiation activated cotton is summarized, as follows:

| AN/GMA in solvent, mole/mole | Solvent | Reaction time, min. | Copolymer add-on, percent | Poly(AN)/poly(GMA) in copllymer, mole/mole |
|---|---|---|---|---|
| 28 | 43% H₂O/57% MeOH | 30 | 15 | 12 |
| 5.9 | Same as above | 30 | 18 | 3.1 |
| 3.0 | do | 30 | 21 | 1.3 |
| 1.3 | do | 30 | 27 | 0.70 |
| 0.50 | do | 30 | 68 | 0.27 |

EXAMPLE 5

The method of Example 1 except that the monomer mixture was acrylonitrile-allyl methacrylote (AMA). The range of selected variations in compositions and extent of copolymerization of acrylonitrile-allyl methacrylate with radiation activated cotton is summarized, as follows:

| AN/AMA in solvent, mole/mole | Solvent | Reaction time, min. | Copolymer add-on, percent | Poly(AN)/poly(AMA) in copolymer, mole/mole |
|---|---|---|---|---|
| 3.7 | 13% H₂O/87% DMSO | 45 | 10 | 2.8 |
| 1.8 | Same as above | 45 | 8 | 1.7 |
| 0.61 | do | 45 | 7 | 0.72 |
| 0.28 | do | 45 | 7 | 0.36 |
| 1.8 | 0% H₂O/100% DMSO | 45 | 7 | 2.3 |
| 1.8 | 20% H₂O/80% DMSO | 45 | 20 | 1.3 |
| 1.8 | 23% H₂O/77% DMSO | 45 | 10 | 1.5 |

EXAMPLE 6

The method of Example 1 except that the monomer (BDMA). The range of selected variations in composition and extent of copolymerization of acrylonitrile-1,3-butylene dimethacrylate with radiation activated cotton is summarized, as follows:

| AN/BDMA in solvent, mole/mole | Solvent | Reaction time, min. | Copolymer add-on, percent | Poly(AN)/poly(BDMA) in copolymer, mole/mole |
|---|---|---|---|---|
| 31 | 11% H₂O/89% DMSO | 180 | 42 | 17 |
| 17 | Same as above | 180 | 52 | 8.3 |
| 11 | do | 180 | 57 | 5.6 |
| 6.8 | do | 180 | 53 | 4.3 |
| 1.7 | do | 180 | 40 | 1.6 |
| 0.85 | do | 180 | 37 | 0.88 |
| 0.52 | do | 180 | 36 | 0.65 |
| 11 | do | 30 | 27 | 7.4 |
| 11 | do | 60 | 36 | 6.7 |
| 11 | do | 120 | 47 | 6.0 |

EXAMPLE 7

The method of Example 1 except that the monomer mixture was acrylonitrile-styrene (S). The range of selected variations in composition and extent of copolymerization of acrylonitrile-styrene with radiation activated cotton is summarized, as follows:

| AN/S in solvent, mole/mole | Solvent | Reaction time, min. | Copolymer add-on, percent | Poly(AN)/ poly (S) in copolymer, mole/moler |
|---|---|---|---|---|
| 50 | 21% H₂O/79% MeOH | 30 | 14 | 5.8 |
| 24 | Same as above | 30 | 28 | 3.0 |
| 16 | do | 30 | 43 | 2.0 |
| 11 | do | 30 | 45 | 1.6 |
| 8.7 | do | 30 | 52 | 1.2 |
| 6.9 | do | 30 | 46 | 1.3 |
| 5.2 | do | 30 | 40 | 1.2 |
| 3.5 | do | 30 | 35 | 0.93 |
| 1.8 | do | 30 | 26 | 0.76 |
| 8.7 | do | 10 | 21 | 1.7 |
| 8.7 | do | 40 | 56 | 1.4 |
| 8.7 | do | 120 | 114 | 1.3 |
| 8.7 | 7% H₂O/93% MeOH | 30 | 16 | 2.5 |
| 8.7 | 28% H₂O/72% MeOH | 30 | 47 | 1.3 |
| 8.7 | 39% H₂O/61% MeOH | 30 | 39 | 1.2 |

EXAMPLE 8

The method of Example 1 except that the monomer mixture was acrylonitrile-vinylidene chloride (VC). The range of selected variations in composition and extent of copolymerization of acrylonitrile-vinylidene chloride with radiation activated cotton is summarized, as follows:

| AN/VC in solvent, mole/mole | Solvent | Reaction time, min. | Copolymer add-on, percent | Pol.(AN)/ poly (VC) in copolymer, mole/mole |
|---|---|---|---|---|
| 4.8 | 20% H₂O/80% MeOH | 180 | 13 | 7.0 |
| 1.8 | Same as above | 180 | 14 | 3.7 |
| 1.2 | do | 180 | 13 | 2.9 |
| 0.81 | do | 180 | 12 | 1.9 |
| 0.30 | do | 180 | 11 | 0.73 |

EXAMPLE 9

The method of Example 1 except that the monomer mixture was acrylonirtile-vinyl pyrrolidone (VP). The range of selected variations in composition and extent of copolymerization of acrylonitrile-vinyl pyrrolidone with raditation activated cotton is summarized, as follows:

| AN/VP in solvent, mole/mole | Solvent | Reaction time, min. | Copolymer add-on, percent | Poly(AN) poly (VP) in copolymer, mole/mole |
|---|---|---|---|---|
| 6.6 | 20% H₂O/80%DMSO | 180 | 102 | 3.5 |
| 2.5 | Same as above | 180 | 112 | 2.2 |
| 1.1 | do | 180 | 105 | 1.6 |
| 0.41 | do | 180 | 89 | 1.4 |

We claim:

1. A process for preparing rigid-construction, cellulose-copolymer products useful as industrial textiles, comprising:
   (a) drying a fibrous, cellulosic material, in the absence of oxygen, to a moisture content below about 2%;
   (b) irradiating the dried, cellulosic material from step (a) with a radioactive source to a dosage of about 1 megarad;
   (c) immersing, for about 30 minutes at about room temperature, about 1.5 parts, by weight, of the irradiated, cellulosic material from step (b) in about 50 parts, by weight, of an aqueous-methanolic solution consisting of about 15 parts, by weight, of a binary monomer mixture dissolved in about 35 parts of aqueous-methanol solvent, said binary monomer mixture consisting of acrylonitrile and methyl methacrylate in a mole ratio ranging about from 0.11 to 23 moles of acrylonitrile per mole of methyl methacrylate, and said aqueous-methanol solvent consisting of about 43% water and 57% methanol, by volume, thereby forming a rigid, fibrous, cellulose-copolymer product; and
   (d) washing the rigid, fibrous, cellulose-copolymer product free of unreacted material.

2. A process for preparing rigid-construction, cellulose-copolymer products useful as industrial textiles, comprising:
   (a) drying a fibrous, cellulosic material, in the absence of oxygen, to a moisture content below about 2%;
   (b) irradiating the dried, cellulosic material from step (a) with a radioactive source to a dosage of about 1 megarad;
   (c) immersing, for about 30 minutes at about room temperatur,e about 1.5 parts, by weight, of the irradiated, cellulosic material from step (b) in about 50 parts, by weight, of an aqueous-methanolic solution consisting of about 15 parts, by weight, of a binary monomer mixture dissolved in about 35 parts of aqueous-methanol solvent, said binary monomer mixture consisting of acrylonitrile and butyl methacrylate in a mole ratio ranging from about 0.49 to 34 moles of acrylonirtile per mole of butyl methacrylate, and said aqueous-methanol solvent consisting of about 23% water and 77% methanol, by volume, thereby forming a rigid, fibrous, cellulose-copolymer product; and
   (d) washing the rigid, fibrous, cellulose-copolymer product free of unreacted material.

3. A process for preparing rigid-construction, cellulose-copolymer products useful as industrial textiles, comprising:
   (a) drying a fibrous, cellulosic material, in the absence of oxygen, to a moisture content below about 2%;
   (b) irradiating the dried, cellulosic material from step (a) with a radioactive source to a dosage of about 1 megarad;
   (c) immersing, for about from 180 to 1140 minutes at about room temperature, about 1.5 parts, by weight, of the irradiated, cellulosic material from step (b) in about 50 parts, by weight, of a methylethylketone-dimethylsulfoxide solution consisting of about 15 parts, by weight, of a binary monomer mixture dissolved in about 35 parts of methylethylketone-dimethylsulfoxide solvent, said binary monomer mixture consisting of acrylonitrile and lauryl methacrylate in a mole ratio ranging about from 2.3 to 9.2 moles of acrylonitrile per mole of lauryl methacrylate, and said methylethylketone-dimethylsulfoxide solvent consisting of about 32% methylethylketone and 68% dimethylsulfoxide, by volume, thereby forming a rigid, fibrous, cellulose-copolymer product; and
   (d) washing the rigid, fibrous, cellulose-copolymer, product free of unreacted material.

4. A process for preparing rigid-construction, cellulose-copolymer products useful as industrial textiles, comprising:
   (a) drying a fibrous, cellulosic material, in the absence of oxygen, to a moisture content below about 2%;
   (b) irradiating the dried, cellulosic material from step (a) with a radioactive source to a dosage of about 1 megarad;
   (c) immersing, for about 30 minutes at about room temperature, about 1.5 parts, by weight, of the irradiated, cellulosic material from step (b) in about 50 parts, by weight, of an aqueous-methanolic solution consisting of about 15 parts, by weight, of a binary monomer mixture dissolved in about 35 parts of aqueous-methanol solvent, said binary monomer mixture consisting of acrylonitrile and glycidyl methacrylate in a mole ratio ranging from about 0.50 to 28 moles of acrylonitrile per mole of glycidyl methacrylate, and said aqueous-methanol solvent consisting of about 43% water and 57% methanol, by volume, thereby forming a rigid, fibrous, cellulose-copolymer product; and
   (d) washing the rigid, fibrous, cellulose-copolymer product free of unreacted material.

5. A process for preparing rigid-construction, cellulose-copolymer products useful as industrial textiles, comprising:
   (a) drying a fibrous, cellulosic material, in the absence of oxygen, to a moisture content below about 2%;
   (b) irradiating the dried, cellulosic material from step (a) with a radioactive source to a dosage of about 1 megarad;
   (c) immersing, for about 45 minutes at about room temperature, about 1.5 parts, by weight, of the irradiated, cellulosic material from step (b) in about 50 parts, by weight, of an aqueous-dimethylsulfoxide solution consisting of about 15 parts, by weight, of a binary monomer mixture dissolved in about 35 parts of aqueous-dimethylsulfoxide solvent, said binary monomer mixture consisting of acrylonitrile and allyl methacrylate in a mole ratio ranging about from 0.28 to 3.7 moles of acrylonitrile per mole of allyl methacrylate, and said aqueous-dimethylsulfoxide solvent consisting of about from 0% to 23% water and about from 100% to 77% dimethylsulfoxide, by volume, thereby forming a rigid, fibrous, cellulose-copolymer product; and
   (d) washing the rigid, fibrous, cellulose-copolymer product free of unreacted material.

6. A process for preparing rigid-construction, cellulose-copolymer products useful as industrial textiles, comprising:
   (a) drying a fibrous, cellulosic material, in the absence of oxygen to a moisture content below about 2%;
   (b) irradiating the dried, cellulosic material from step (a) with a radioactive source to a dosage of about 1 megarad;
   (c) immersing, for about from 30 to 180 minutes at about room temperature, about 1.5 parts, by weight, of the irradiated, cellulosic material from step (b) in about 50 parts, by weight, of an aqueous-dimethylsulfoxide solution consisting of about 15 parts, by weight, of a binary monomer mixture dissolved in about 35 parts of aqueous-dimethylsulfoxide solvent, said binary monomer mixture consisting of acrylonitrile and 1,3-butylene dimethacrylate in a mole ratio ranging from about 0.52 to 31 moles of acrylonitrile per mole of 1,3-butylene dimethacrylate, and said aqueous-dimethylsulfoxide solvent consisting of about 11% water and 89% dimethylsulfoxide, by volume, thereby forming a rigid, fibrous, cellulose-copolymer product; and
   (d) washing the rigid, fibrous, cellulose-copolymer product free of unreacted material.

7. A process for preparing rigid-construction, cellulose-copolymer products useful as industrial textiles, comprising:
   (a) drying a fibrous, cellulosic material, in the absence of oxygen, to a moisture content below about 2%;
   (b) irradiating the dried, cellulosic material from step (a) with a radio-active source to a dosage of about 1 megarad;
   (c) immersing, for about from 10 to 120 minutes at about room temperature, about 1.5 parts, by weight, of the irradiated, cellulosic material from step (b) in about 50 parts, by weight of an aqueous-methanolic solution consisting of about 15 parts, by weight, of a binary monomer mixture dissolved in about 35 parts of aqueous-methanol solvent, said binary monomer mixture consisting of acrylonitrile and styrene in a mole ratio ranging from 1.8 to 50 moles of acrylonitrile per mole of styrene, and said aqueous-methanol solvent consisting of about from 7% to 39% water and about from 93% to 61% methanol, by volume, thereby forming a rigid, fibrous, cellulose-copolymer product; and
   (d) washing the rigid, fibrous, cellulose-copolymer product free of unreacted material.

8. A process for preparing rigid-construction, cellulose-copolymer products useful as industrilal textiles, comprising:
   (a) drying a fibrous, cellulosic material, in the absence of oxygen, to a moisture content below about 2%;
   (b) irradiating the dried, cellulosic material from step (a) with a radioactive source to a dosage of about 1 megarad;
   (c) immersing, for about 180 minutes at about room temperature, about 1.5 parts, by weight, of the irradiated, cellulosic material from step (b) in about 50 parts, by weight, of an aqueous-methanolic solution consisting of about 15 parts, by weight, of a binary monomer mixture dissolved in about 35 parts of aqueous-methanol solvent, said binary monomer mixture consisting of acrylonitrile and vinylidene chloride in a mole ratio ranging from 0.30 to 4.8 moles of acrylonitrile per mole of vinylidene chloride, and said aqueous-methanol solvent consisting of about 20% water and 80% methanol, by volume, thereby forming a rigid, fibrous, cellulose-copolymer product; and
   (d) washing the rigid, fibrous, cellulose-copolymer product free of unreacted material.

9. A process for preparing rigid-construction, cellulose-copolymer products useful as industrial textiles, comprising:
   (a) drying a fibrous, cellulosic material, in the absence of oxygen, to a moisture content below about 2%;
   (b) irradiating the dried, cellulosic material from step (a) with a radioactive source to a dosage of about 1 megarad;
   (c) immersing, for about 180 minutes at about room temperature, about 1.5 parts, by weight, of the irradiated, cellulosic material from step (b) in about 50 parts, by weight, of an aqueous-dimethylsulfoxide solution consisting of about 15 parts, by weight, of a binary monomer mixture dissolved in about 35 parts of aqueous-dimethylsulfoxide solvent, said binary monomer mixture consisting of acrylonitrile and vinyl pyrrolidone in a mole ratio ranging from about 0.41 to 6.6 moles of acrylonitrile per mole of vinyl pyrrolidone, and said aqueous-dimethylsulfoxide solvent consisting of about 20% water and 80% dimethylsulfoxide, by volume, thereby forming a rigid, fibrous, cellulose-copolymer product; and
   (d) washing the rigid, fibrous, cellulose-copolymer product free of unreacted material.

References Cited
FOREIGN PATENTS
1,473,659   3/1967   France.

OTHER REFERENCES
Nakamora et al., Cellulose Graft Copolymers III, Effects of Oxygen on Graft Copolymerization of Ethyl Acrylate With γ-Irradiated Celluose, J. of Applied Polymer Science, vol. 15, pp. 391–401 (1971).

MURRAY TILLMAN, Primary Examiner

R. B. TURER, Assistant Examiner

U.S. Cl. X.R.

8—116.2; 260—17.4 GC